US011173866B2

(12) United States Patent
Deng et al.

(10) Patent No.: US 11,173,866 B2
(45) Date of Patent: Nov. 16, 2021

(54) AIRBAG HAVING KNEE CHAMBER AND UPPER CHAMBER

(71) Applicant: Ford Global Technologies, LLC, Dearborn, MI (US)

(72) Inventors: Zhibing Deng, Northville, MI (US); Tzu-Chen Weng, Troy, MI (US); Deepak Patel, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 200 days.

(21) Appl. No.: 16/521,087

(22) Filed: Jul. 24, 2019

(65) Prior Publication Data

US 2021/0024026 A1 Jan. 28, 2021

(51) Int. Cl.

| | |
|---|---|
| ***B60R 21/233*** | (2006.01) |
| ***B60R 21/206*** | (2011.01) |
| ***B60R 21/261*** | (2011.01) |
| ***B60R 21/26*** | (2011.01) |
| ***B60R 21/239*** | (2006.01) |
| *B60R 21/00* | (2006.01) |

(52) U.S. Cl.

CPC .......... *B60R 21/233* (2013.01); *B60R 21/206* (2013.01); *B60R 21/239* (2013.01); *B60R 21/261* (2013.01); *B60R 21/26* (2013.01); *B60R 2021/0051* (2013.01)

(58) Field of Classification Search

CPC ... B60R 21/206; B60R 21/261; B60R 21/233; B60R 21/239; B60R 21/26; B60R 2021/0051; B60R 21/2346; B60R 2021/23107; B60R 2021/23324; B60R 21/231; B60R 2021/23169

See application file for complete search history.

(56) References Cited

U.S. PATENT DOCUMENTS 5,492,363 A * 2/1996 Hartmeyer ............ B60R 21/239 280/738
5,775,729 A 7/1998 Schneider et al.
7,325,830 B2 * 2/2008 Higuchi ................ B60R 21/233 280/738
7,604,252 B2 * 10/2009 Heitplatz .............. B60R 21/206 280/729

(Continued)

FOREIGN PATENT DOCUMENTS

EP 1826073 A1 * 8/2007 ........... B60R 21/231
JP H1071911 A 3/1998

(Continued)

OTHER PUBLICATIONS

Nogi et al. JP 2011 143749A, Machine English Translation, ip.com (Year: 2011).*

*Primary Examiner* — Karen Beck

(74) *Attorney, Agent, or Firm* — Frank A. MacKenzie; Bejin Bieneman PLC

(57) ABSTRACT

An airbag assembly includes an airbag having a knee chamber and an upper chamber. A wall fluidly isolates the knee chamber and the upper chamber. A sleeve extends from the knee chamber through the wall to the upper chamber and fluidly communicates the knee chamber and the upper chamber. A one-way vent is in the sleeve. The one-way vent allows for the knee chamber and the upper chamber to be maintained at different relative pressures.

16 Claims, 8 Drawing Sheets

10 54 14 18 40 52 38 36 84 72 170 124 88 80 82 20 150 16 68 78 66 62 22 64 58 56

(56) References Cited

U.S. PATENT DOCUMENTS 7,654,557 B2 * 2/2010 Enders .................. B60R 21/206 280/728.2
9,296,358 B2 3/2016 Chen et al.
9,321,425 B2 * 4/2016 Charpentier .......... B60R 21/233
2004/0201209 A1 * 10/2004 Schwark ............... B60R 21/231 280/743.1
2006/0028004 A1 * 2/2006 Oota ..................... B60R 21/231 280/733
2006/0175809 A1 * 8/2006 Yamaji ............. B60R 21/23138 280/729
2008/0143086 A1 * 6/2008 Higuchi .............. B60R 21/2346 280/736
2011/0079991 A1 * 4/2011 Ravenberg .......... B60R 21/2346 280/740
2011/0285114 A1 * 11/2011 Ohara ................. B60R 21/2346 280/730.1
2011/0298200 A1 * 12/2011 Taniguchi ............. B60R 21/239 280/736
2013/0105040 A1 * 5/2013 Langston ................ F16K 15/20 141/3
2015/0074969 A1 3/2015 Jindal et al.
2015/0137496 A1 * 5/2015 Kato ..................... B60R 21/261 280/741
2015/0158454 A1 * 6/2015 Shibata ................. B60R 21/239 280/742
2016/0250992 A1 * 9/2016 Bogenrieder ......... B60R 21/231 280/729
2017/0072890 A1 * 3/2017 Jindal ................... B60R 21/231
2017/0174171 A1 * 6/2017 Dennis ................ B60R 21/2338
2020/0406850 A1 * 12/2020 Takeuchi .............. B60R 21/231
2021/0024026 A1 * 1/2021 Deng .................... B60R 21/231
2021/0094499 A1 * 4/2021 Deng .................... B60R 21/013

FOREIGN PATENT DOCUMENTS

JP 2004330959 A * 11/2004
JP 2011143749 A * 7/2011

* cited by examiner

AIRBAG HAVING KNEE CHAMBER AND UPPER CHAMBER

BACKGROUND

During a vehicle impact, occupants may move in a direction influenced by the momentum of the vehicle. In a frontal vehicle impact, an occupant may be biased toward a vehicle component, e.g., an instrument panel, in front of the occupant.

DETAILED DESCRIPTION

Figure 1:
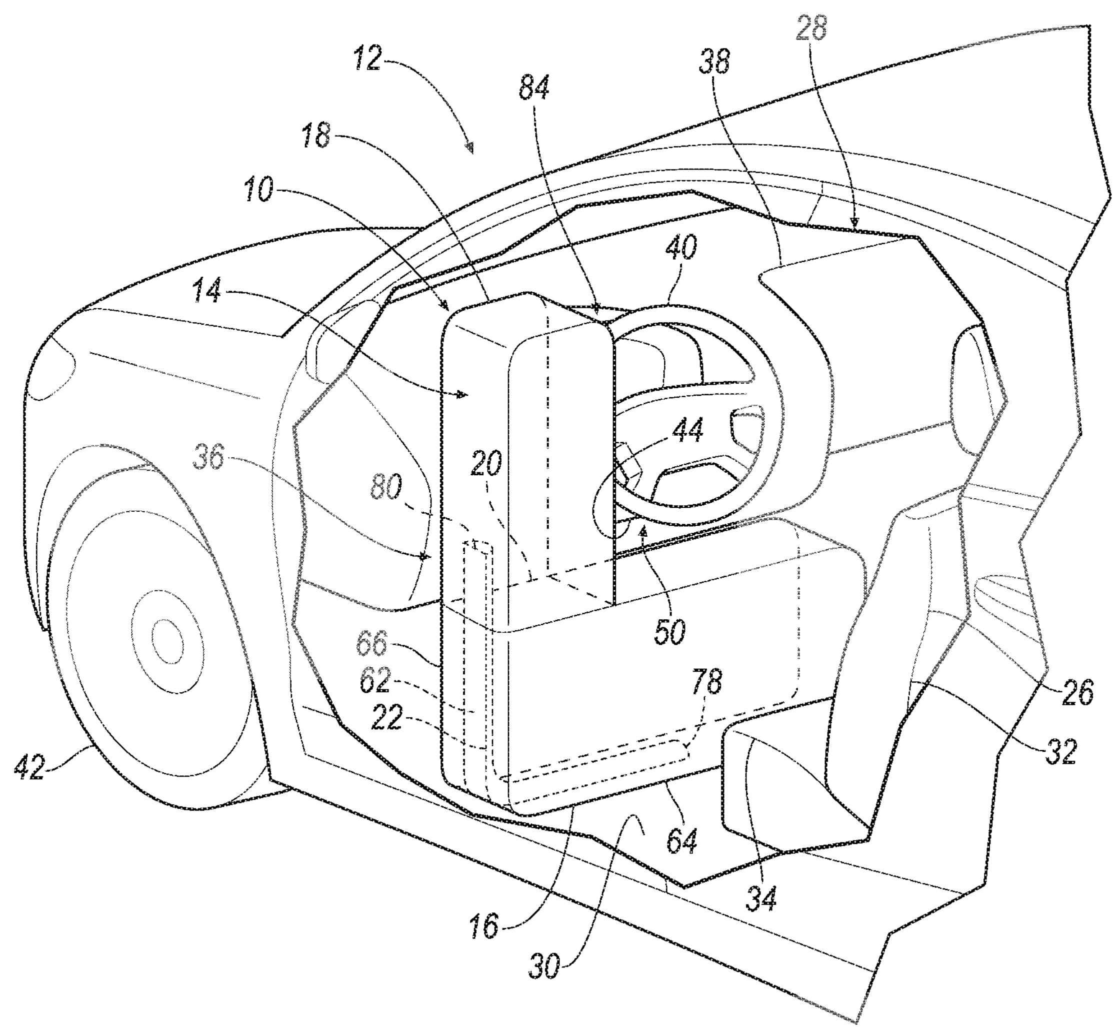
FIG. 1 is a perspective view of a portion of a vehicle with an airbag in an inflated position.

An airbag assembly includes an airbag having a knee chamber and an upper chamber. A wall fluidly isolates the knee chamber and the upper chamber. A sleeve extends from the knee chamber through the wall to the upper chamber and fluidly communicating the knee chamber and the upper chamber. A one-way vent is in the sleeve.

The one-way vent may be designed to allow fluid flow from the knee chamber to the upper chamber and prevent fluid flow from the upper chamber to the knee chamber.

The one-way vent may include an obstruction in the sleeve. The sleeve may have a collapsible wall designed to collapse on the obstruction when pressure in the upper chamber is greater than the pressure in the knee chamber. The collapsible wall of the sleeve may be in the upper chamber. The collapsible wall may be designed to be spaced from the obstruction when the pressure in the knee chamber is greater than the pressure in the upper chamber. The obstruction may include a portion of the collapsible wall fixed in a bunched configuration. The obstruction may include a ledge fixed in the sleeve. The ledge may be a different type of material than the material of the sleeve. The one-way vent may include a flap designed open when the pressure in the knee chamber is greater than pressure in the upper chamber and designed to close when pressure in the upper chamber is greater than pressure in the knee chamber.

The knee chamber is elongated along a cross-vehicle axis between a first end and a second end and the upper chamber extends upwardly from first end.

The knee chamber may have a bottom end elongated along a cross-vehicle axis between a first end and a second end and the sleeve is positioned at the bottom end and the first end.

The upper chamber may extend upwardly from first end.

The airbag assembly may include inflator in knee chamber.

The upper chamber may be vented more than the knee chamber.

An instrument panel assembly includes an instrument panel having a vehicle-rearward face. An airbag inflatable to an inflated position adjacent the vehicle-rearward face. The airbag has a knee chamber and an upper chamber. The airbag includes a wall fluidly isolating the knee chamber and the upper chamber. The airbag includes a sleeve extending through the wall and fluidly communicating the knee chamber and the upper chamber. The airbag includes a one-way vent in the sleeve.

The instrument panel assembly may include a steering column, the knee chamber being below the steering column and the upper chamber extending upward from the knee chamber along the steering column in the inflated position.

The knee chamber may have a bottom end elongated along a cross-vehicle axis between a first end and a second end and the sleeve is positioned at the bottom end and the first end.

With reference to the Figures, wherein like numerals indicate like parts throughout the several views, an airbag assembly 10 includes an airbag 14 having a knee chamber 16 and an upper chamber 18. A wall 20 fluidly isolates the knee chamber 16 and the upper chamber 18. A sleeve 22 extends from the knee chamber 16 through the wall 20 to the upper chamber 18 and fluidly communicates the knee chamber 16 and the upper chamber 18. A one-way vent 124, 224, 324 is in the sleeve 22.

Since the wall 20 fluidly isolates the knee chamber 16 from the upper chamber 18, the one-way vent 124, 224, 324 in the sleeve 22 controls gas flow between the knee chamber 16 and the upper chamber 18. This allows for the knee chamber 16 and the upper chamber 18 to be inflated to different pressures. For example, the knee chamber 16 and the upper chamber 18 may be vented differently, as described below, and thus may maintain pressure at different durations leading to pressure differences between the knee chamber 16 and the upper chamber 18. These pressure differences may be used control the kinematics of different portions of the occupant.

As an example, with reference to FIG. 1, the upper chamber 18 may be positioned to be contacted by the head of the occupant. The one-way vent 124, 224, 324 may be configured to allow gas flow from the knee chamber 16 to the upper chamber 18 and to prevent gas flow from the upper chamber 18 to the knee chamber 16. In such an example, inflation gases flow through the sleeve 22 from the knee chamber 16 to the upper chamber 18 and the one-way vent 124, 224, 324 prevents flow of gas from the upper chamber 18 through the sleeve 22. In this example, the upper chamber 18 may be vented more than the knee chamber 16 such that the pressure in the knee chamber 16 is maintained longer than the pressure in the upper chamber 18. The knee chamber 16 may be maintained at a greater pressure than the upper chamber 18 so that the knee chamber 16 controls the kinematics of the knees of the occupant and the upper chamber 18 controls the kinematics of the head and/or torso of the occupant.

The vehicle 12, shown in FIG. 1, may be any passenger or commercial automobile such as a car, a truck, a sport utility vehicle, a crossover vehicle, a van, a minivan, a taxi, a bus, etc.

The vehicle 12 defines the vehicle-longitudinal axis A1, i.e., extending between a front and a rear of the vehicle 12. The vehicle 12 defines the cross-vehicle axis, i.e., extending between a left side and a right side of the vehicle 12. The vehicle-longitudinal axis A1 and the cross-vehicle axis A2 may be perpendicular to each other. The front, rear, left side, and right side may be relative to a forward driving direction when wheels 42 of the vehicle 12 are all parallel with each other, etc.

The vehicle 12 includes one or more seats 26. The seat 26 shown in FIG. 1 is a bucket seat, but as other examples the seat 26 may be a bench seat or another type of seat. The seat 26 is a front seat, i.e., is at a front of a passenger cabin 28 of the vehicle 12. The airbag assembly 10 is in front of the seat 26. In other words, an occupant of the seat 26 in a forward-facing position faces the airbag assembly 10. The seat 26 is shown as a left-front seat in FIG. 1, and as another example the airbag assembly 10 may be a right-front seat. In examples where the vehicle 12 includes more than one front seat, the vehicle 12 may include more than one airbag assembly 10, i.e., one airbag assembly 10 for each front seat 26. The seat 26 may be supported by a floor 30 of the vehicle 12.

The seat 26 may include a seat back 32 and a seat bottom 34. The seat back 32 is supported by the seat bottom 34 and may be stationary or movable relative to the seat bottom 34. The seat back 32 the seat bottom 34 may be adjustable relative to each other and/or relative to the floor 30 in multiple degrees of freedom.

The vehicle 12 may include an instrument panel assembly 36, shown in FIG. 1. The instrument panel assembly 36 may be at a forward end of a passenger cabin 28 and face the seat 26. The instrument panel assembly 36 may include an instrument panel 38. The instrument panel 38 may span the passenger cabin 28 in a cross-vehicle direction. The instrument panel 38 may include controls, gauges, displays, etc.

The instrument panel assembly 36 may include a steering wheel 40. The steering wheel 40 allows an operator to steer the vehicle 12 by transmitting rotation of the steering wheel 40 to steer wheels 42 of the vehicle 12. The instrument panel assembly 36 may include a steering column 44. The steering column 44 includes an outer shroud and a steering shaft inside the outer shroud. The steering shaft 48 is connected to the steering wheel 40 and transfers rotation of the steering wheel 40 to steer the wheels 42, e.g., through a steering rack.

With continued reference to FIG. 1, the instrument panel 38 has a vehicle-rearward face and the airbag 14 is inflatable to an inflated position adjacent the vehicle-rearward face. Specifically, the airbag assembly 10 is supported by the instrument panel 38, e.g., below and/or to a side of the steering column 44 and/or the steering wheel 40. The airbag assembly 10 may be behind the vehicle-rearward face (i.e., in a vehicle forward direction) in an uninflated position (not shown) and may expand through the vehicle-rearward face into the passenger cabin 28.

In the inflated position, the upper chamber 18 extends upwardly from the knee chamber 16 in the inflated position. This positions the knee chamber 16 to receive the knees of the occupant and positions the upper chamber 18 to receive the torso and/or head of the occupant during a vehicle impact that urges the occupant toward the knee chamber 16 and upper chamber 18, respectively. Specifically, the knee chamber 16 may extend through the vehicle-rearward face of the instrument panel 38 and may be supported by the instrument panel 38, and the upper chamber 18 may be supported by the knee chamber 16. The upper chamber 18 may abut the vehicle-rearward face of the instrument panel 38 in the inflated position.

In one example, the airbag assembly 10 may be near the steering wheel 40 and/or the steering column 44. In such an example, in the inflated position, the knee chamber 16 may be below the steering column 44 and/or the steering wheel 40. Specifically, the knee chamber 16 may extend beyond the steering column 44 and/or the steering wheel 40 in the cross-vehicle direction. The knee chamber 16 may abut a lower surface 50 of the steering column 44 and/or the steering wheel 40.

With continued reference to the examples shown in FIGS. 1-8, in the inflated position, the upper chamber 18 extends upwardly from the knee chamber 16 along a side of the steering column 44 and/or the steering wheel 40. The upper chamber 18 may abut a side surface 84 of the steering column 44 and/or the steering wheel 40.

Figure 8:
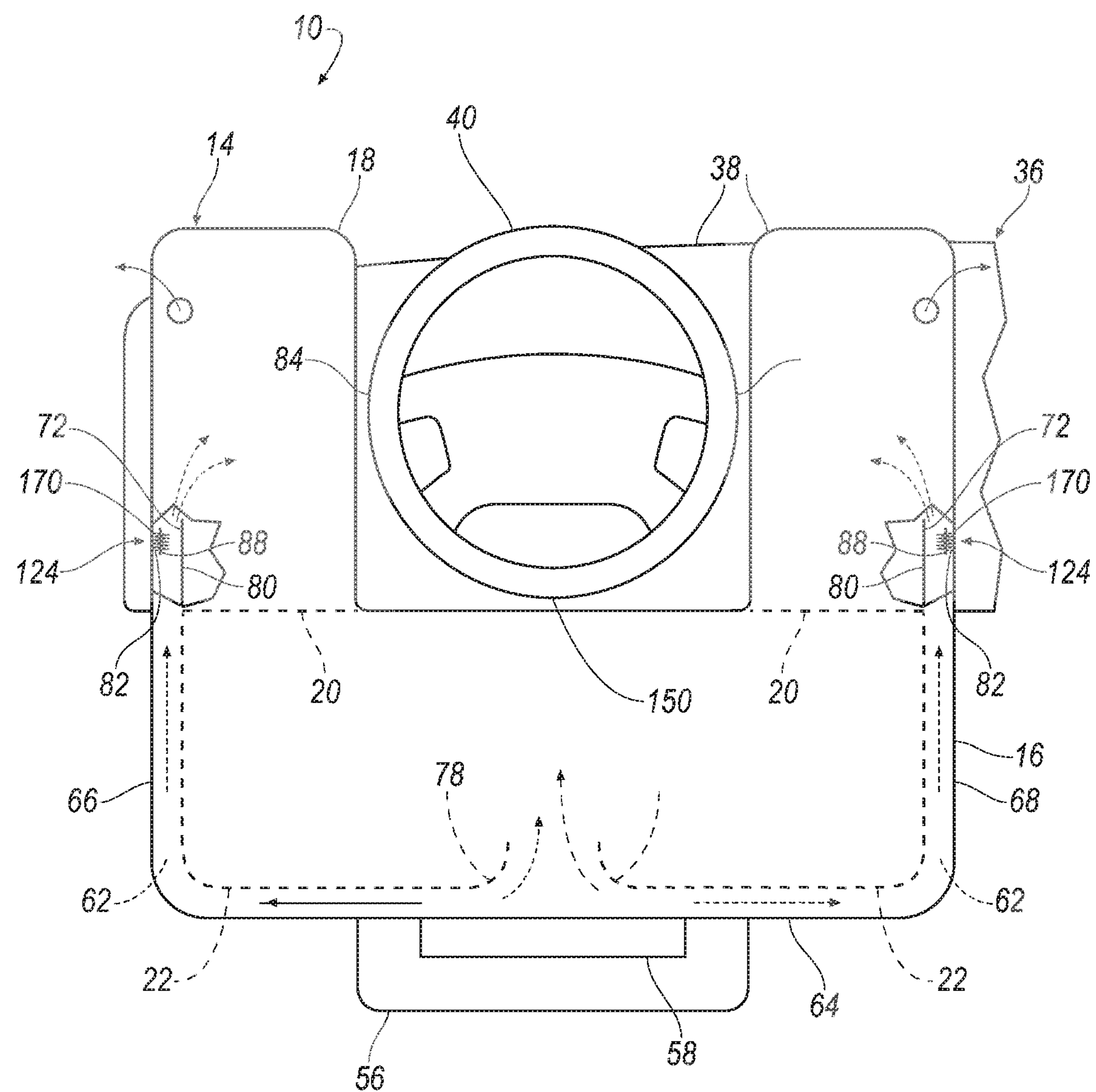
FIG. 8 is a front view of a portion of the vehicle including another embodiment of the airbag including two upper chambers extending upwardly from the knee chamber.

With reference to FIG. 8, the airbag 14 may include two upper chambers 18 extending upwardly from the knee chamber 16 in the inflated position. Common numerals are used to identify common features in the two upper chambers 18 in FIG. 8. The two upper chambers 18 may be mirror images of each other, as shown in FIG. 8, or may have different size, shape, position, etc. With continued reference to FIG. 8, the two upper chambers 18 may extend upwardly on opposite sides of the steering wheel 40 and/or steering column 44.

The vehicle 12 may include a driver airbag 52 mounted to the steering wheel 40. The driver airbag 52 is shown, for example, in FIG. 2. The driver airbag 52 is inflatable to a position adjacent the airbag 14. The driver airbag 52 may abut the airbag 14 and/or may overlap the airbag 14 in a cross-vehicle direction. The airbag 14 and the driver airbag 52 may operate in conjunction to increase the likelihood of controlling the kinematics of the occupant during an impact that urges the airbag 14 in both a forward and cross-vehicle direction, e.g., a driver side oblique impact, i.e., to reduce the likelihood of slippage between the airbag 14 and the driver airbag 52.

The vehicle 12 may include a side curtain airbag 54 mounted to a roof of the vehicle 12. The side curtain airbag 54 is shown, for example, in FIG. 2. The side curtain airbag 54 is inflatable to a position adjacent the airbag 14. The side curtain airbag 54 may abut the airbag 14 and/or may overlap the airbag 14 in a cross-vehicle direction. The airbag 14 and the side curtain airbag 54 may operate in conjunction to increase the likelihood of controlling the kinematics of the occupant during an impact that urges the airbag 14 in both a forward and cross-vehicle direction, e.g., a driver side oblique impact, i.e., to reduce the likelihood of slippage between the airbag 14 and the side curtain airbag 54.

The airbag assembly 10 includes a housing 56, an inflator 58, and the airbag 14. The inflator 58 and the airbag 14 may be disposed in the housing 56 in an uninflated position. In such an example, the housing 56 supports the airbag 14, e.g., the knee chamber 16, in the inflated position. The housing 56 may be supported by the instrument panel 38. The housing 56 may be of any material, e.g., a rigid polymer, a metal, a composite, etc.

The airbag 14 (i.e., the knee chamber 16, the upper chamber 18, the wall 20, and the sleeve 22) may be a woven polymer or any other suitable material. As one example, the airbag 14 may be woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The inflator 58 expands the airbag 14 with inflation medium, such as a gas, to move the airbag 14 from the uninflated position to the inflated position. The inflator 58 may be, for example, a pyrotechnic inflator 58 that ignites a chemical reaction to generate the inflation medium, a stored gas inflator 58 that releases (e.g., by a pyrotechnic valve) stored gas as the inflation medium, or a hybrid. The inflator 58 may be, for example, at least partially in an inflation chamber, e.g., the inflation chamber of the knee chamber 16, to deliver inflation medium directly to the inflation chamber or may be connected to the inflation chamber through fill tubes, diffusers, etc.

The inflator 58 may be in the knee chamber 16 and feed inflation medium to the upper chamber 18 through the sleeve 22. For example, pressure generated from the inflation medium may be transmitted through the sleeve 22 from the knee chamber 16 to the upper chamber 18. The sleeve 22 communicates pressure from the knee chamber 16 to the upper chamber 18.

As set forth above, the wall 20 fluidly isolates the knee chamber 16 and the upper chamber 18. In other words, substantially no fluid moves across the wall 20 when the knee chamber 16 and the upper chamber 18 are at different relative pressures. When the knee chamber 16 and the upper chamber 18 are at different relative pressures, wall 20 maintains the different relative pressures. The sleeve 22 extends from the knee chamber 16 through the wall 20 to the upper chamber 18 and fluidly communicates the knee chamber 16 and the upper chamber 18. The sleeve 22 may be the only communication between the knee chamber 16 and the upper chamber 18. In other words, the only path to transmit pressure from the knee chamber 16 to the upper chamber 18 is through the sleeve 22.

The sleeve 22 has an end 78 in the knee chamber 16, an end 80 in the upper chamber 18, and a bore 62 extending between the ends 78, 80. The sleeve 22 terminates at the ends 78, 80. When pressure in the knee chamber 16 is greater than pressure in the upper chamber 18, the end 78 in the knee chamber 16 receives fluid from the knee chamber 16 and the end 80 in the upper chamber 18 releases fluid from the sleeve 22 into the upper chamber 18. The sleeve 22 may be sealed between the ends 78, 80.

The knee chamber 16 has a bottom end 64 elongated along a cross-vehicle axis between a first end 66 and a second end 68. The knee chamber 16 terminates at the bottom end 64, the first end 66, and the second end 68. The sleeve 22 may positioned at the bottom end 64 and the first end 66 of the knee chamber 16. This reduces the likelihood that the knees of an occupant will pinch the sleeve 22 and prevent communication from the knee chamber 16 to the upper chamber 18.

The airbag assembly 10 is designed to allow fluid flow from the knee chamber 16 to the upper chamber 18 and to prevent fluid flow from the upper chamber 18 to the knee chamber 16. Specifically, as set forth above, the one-way vent 124, 224, 324 is in the sleeve 22. The one-way vent 124, 224, 324 is designed to allow fluid flow from the knee chamber 16 to the upper chamber 18 and prevent fluid flow from the upper chamber 18 to the knee chamber 16. In other words, the one-way vent 124, 224, 324 is a non-return vent. Accordingly, the upper chamber 18 and the knee chamber 16 may be maintained at different pressures. For example, the knee chamber 16 and the upper chamber 18 may be vented differently such that the knee chamber 16 and the upper chamber 18 maintain different pressures and vent at different rates. If, for example, the head and/or torso of the occupant impacts the upper chamber 18, the one-way vent 124, 224, 324 prevents fluid flow from the upper chamber 18 to the knee chamber 16.

The upper chamber 18 is vented more than the knee chamber 16. In other words, the upper chamber 18 may decrease in pressure at a higher rate than the knee chamber 16. In this example, Different venting may be accomplished with varying numbers and sizes of external vents and/or with fluid permeability of the fabric of the knee chamber 16 and the upper chamber 18 (e.g., different denier, coatings on the fabric, etc.). For example, the upper chamber 18 may include a vent and/or may be uncoated and the knee chamber 16 may be coated.

The one-way vent 124, 224, 324 may include an obstruction 170, 270 in the sleeve 22. In such an example, the sleeve 22 may have a collapsible wall 72 designed to collapse on the obstruction 170, 270 when pressure in the upper chamber 18 is greater than the pressure in the knee chamber 16. The obstruction 170, 270 and the collapsible wall 72 are in the upper chamber 18 such that the pressure in the upper chamber 18 acts on the collapsible wall 72. The collapsible wall 72 is designed to be spaced from the obstruction 170, 270 when the pressure in the knee chamber 16 is greater than the pressure in the upper chamber 18. In other words, the when the pressure in the knee chamber 16 is greater than the pressure in the upper chamber 18, the pressure sleeve 22 is pressurized greater than the upper chamber 18 forcing the collapsible wall 72 away from the obstruction 170, 270 to allow fluid flow from the knee chamber 16 to the upper chamber 18.

Figure 2:
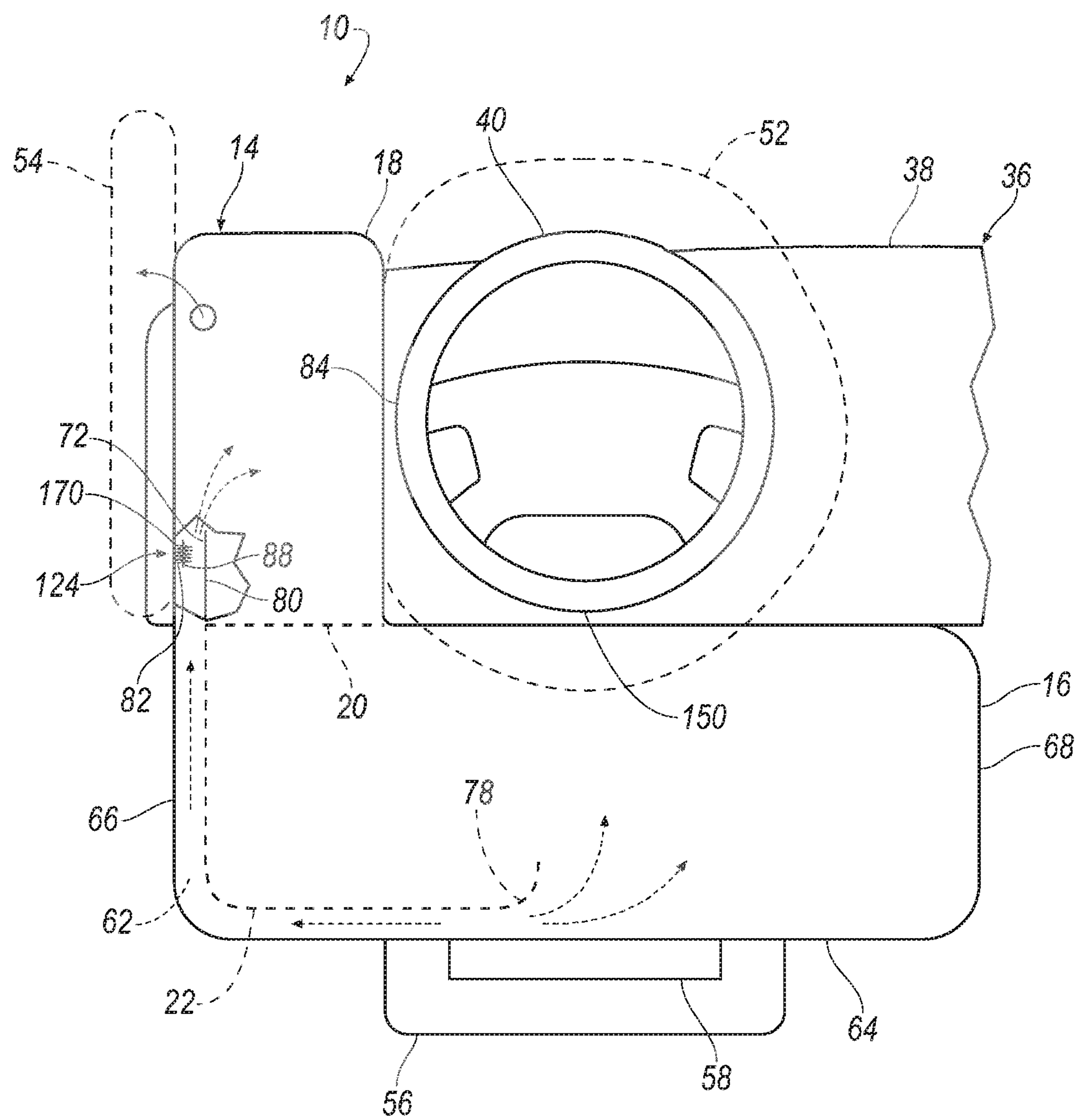
FIG. 2 is a front view of a portion of the vehicle including the airbag in the inflated position, a driver airbag in an inflated position, and a side curtain airbag in an inflated position.
Figure 3:
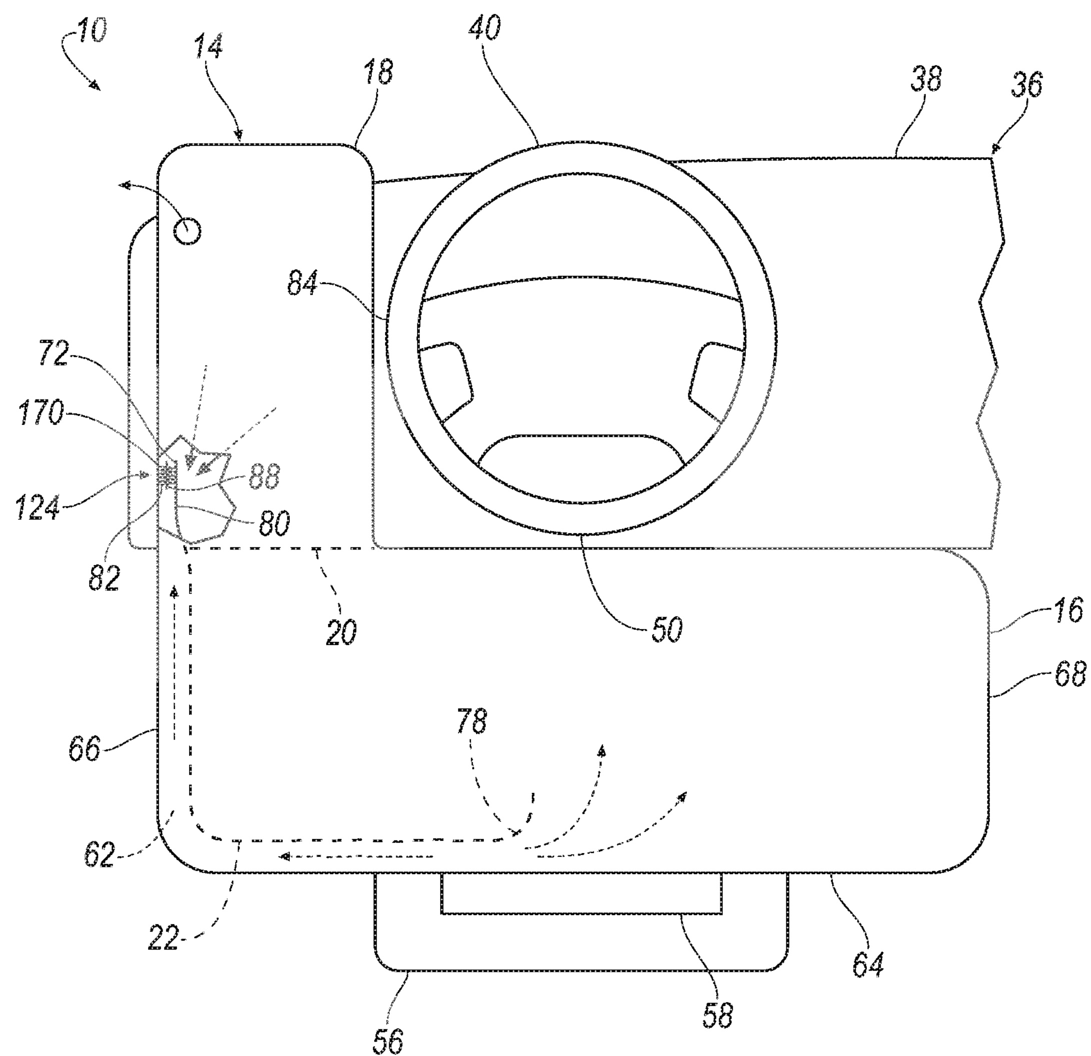
FIG. 3 is the front view of FIG. 2 when pressure in an upper chamber of the airbag is greater than pressure in a knee chamber of the airbag.

As one example, with reference to FIGS. 2 and 3, the obstruction 170 may be a portion of the fabric of the collapsible wall 20 protruding into the bore 62 of the sleeve 22. For example, the obstruction 170 may include a portion of the collapsible wall 20 fixed in a bunched configuration. In other words, a portion of the fabric of the collapsible wall 20 is bunched, i.e., bulging into the sleeve 22. The material of the wall 20 forming the obstruction 170 may be retained in the bunched configuration by, for example, stitching 88 (FIGS. 2-3), adhesive, etc.

Figure 4:
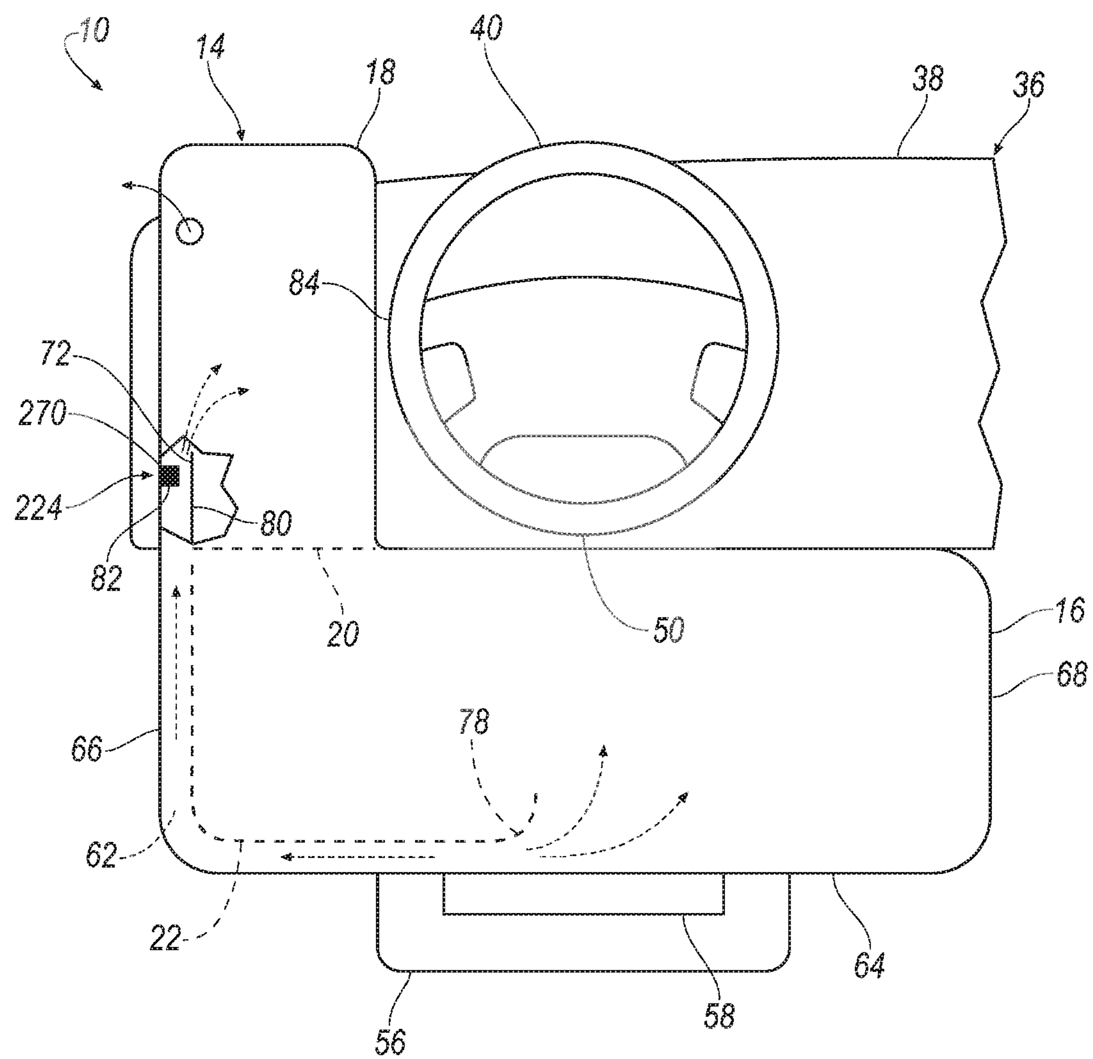
FIG. 4 is a front view of a portion of the vehicle including another embodiment of the airbag.
Figure 5:
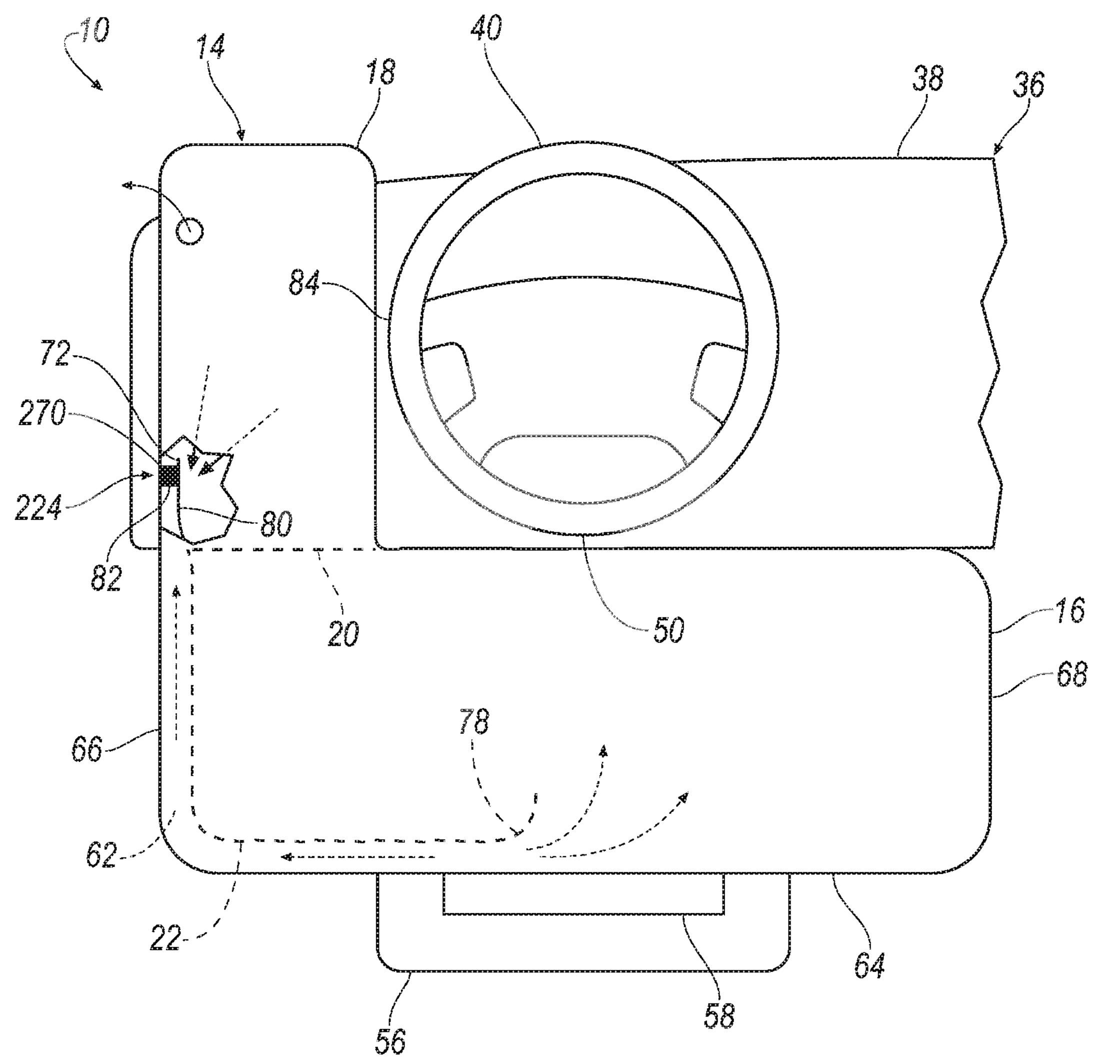
FIG. 5 is the front view of FIG. 4 when pressure in an upper chamber of the airbag is greater than pressure in a knee chamber of the airbag.

As another example, with reference to FIGS. 4 and 5, the obstruction 270 may be formed separately from the sleeve 22 and subsequently fixed to the sleeve 22, e.g., in the bore 62. For example, the obstruction 270 may include a ledge 82 fixed in the sleeve 22. The ledge 82 may be of a different type of material than the sleeve 22. As an example, the ledge 82 may be polymeric. For example, the ledge 82 may be elastomeric (e.g., rubber), plastic (e.g., of a type sufficient to withstand heat of gas flowing through the sleeve 22), or any suitable type of material.

Figure 6:
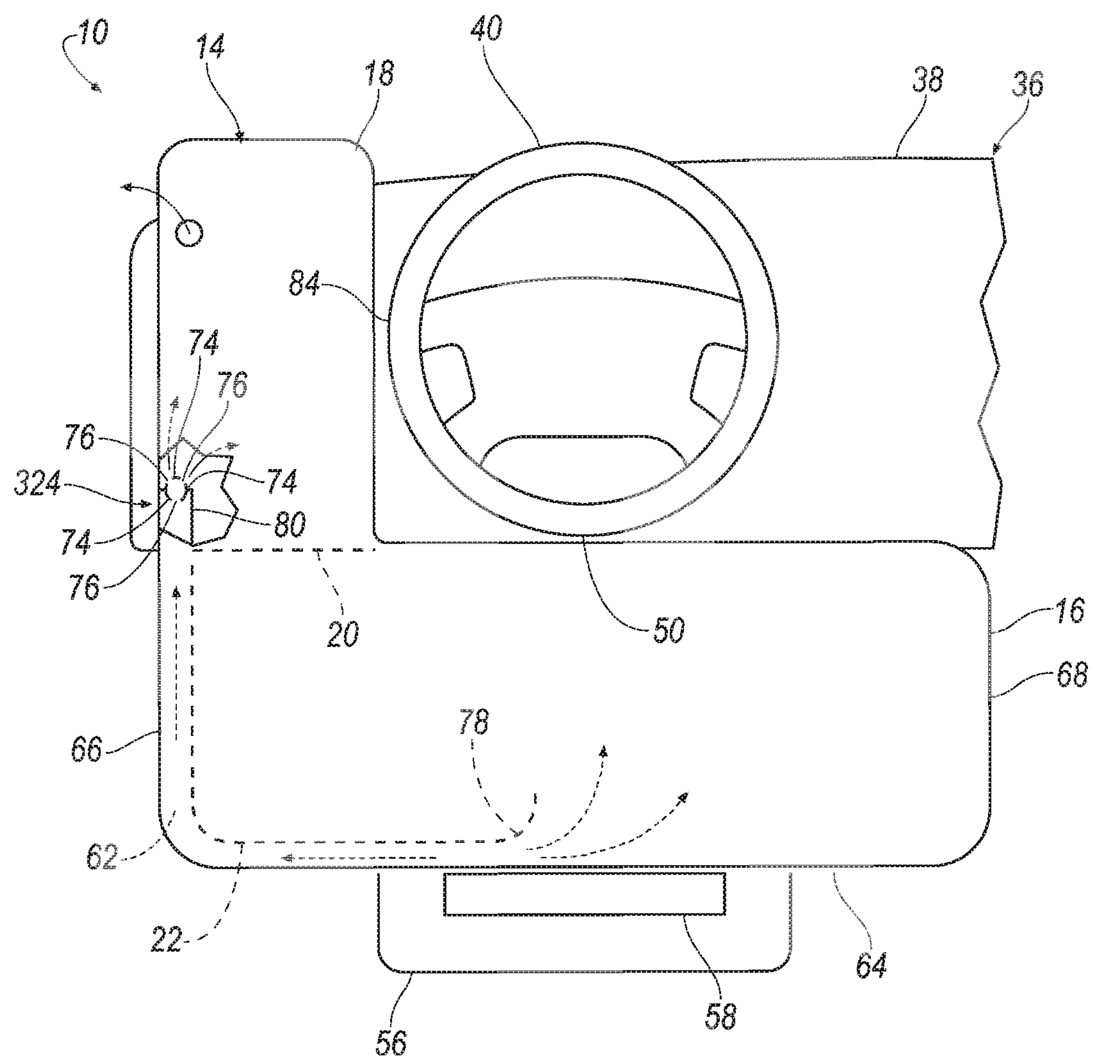
FIG. 6 is a front view of a portion of the vehicle including a third embodiment of the airbag.
Figure 7:
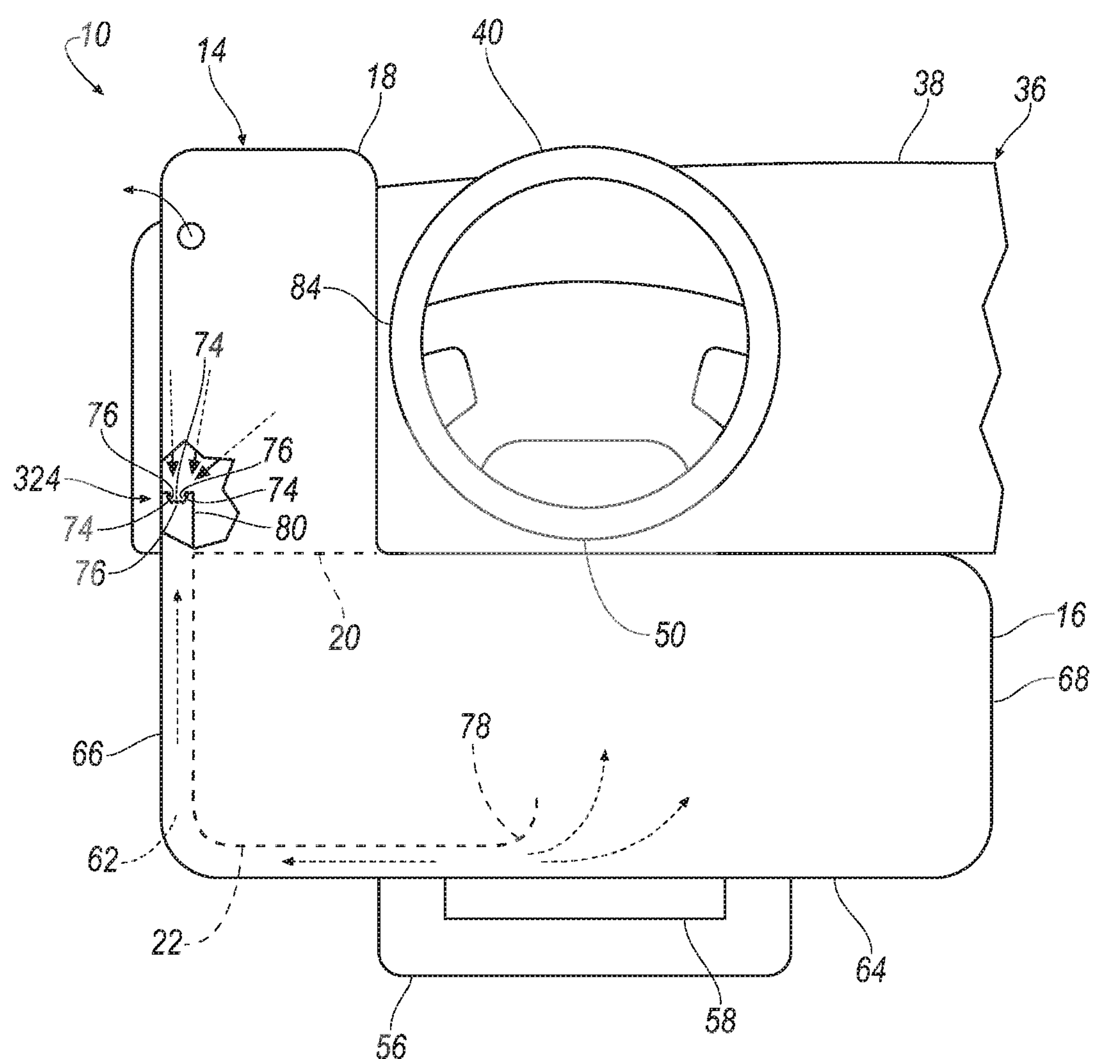
FIG. 7 is the front view of FIG. 6 when pressure in an upper chamber of the airbag is greater than pressure in a knee chamber of the airbag.

As another example, with reference to FIGS. 6 and 7, the one-way vent 324 may include one or more fabric panels 74 that allow fluid flow through the sleeve 22 when relative pressure is greater in the knee chamber 16 and that prevent fluid flow through the sleeve 22 when relative pressure is greater in the upper chamber 18. In the example shown in FIGS. 6 and 7, the one-way vent 324 includes two fabric panels 74 each with one or more holes 76 that allow fluid flow therethrough. When pressure is greater in the knee chamber 16, the fabric panels 74 are spaced from each other (FIG. 6) allowing fluid flow through the one-way vent 324. When pressure is greater in the upper chamber 18 than the knee chamber 16, the pressure in the upper chamber 18 collapses the fabric panels 74 against each other. The holes

76 in the fabric panels 74 are positioned such that each of the holes 76 is blocked by material of the other of the fabric panels 74 to prevent fluid flow therethrough.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag assembly comprising:

an airbag having a knee chamber and an upper chamber;

a wall fluidly isolating the knee chamber and the upper chamber;

a sleeve extending from the knee chamber through the wall to the upper chamber and fluidly communicating the knee chamber and the upper chamber; and a one-way vent in the sleeve;

the one-way vent including an obstruction in the sleeve, the sleeve having a collapsible wall designed to collapse on the obstruction when pressure in the upper chamber is greater than the pressure in the knee chamber;

the obstruction includes a ledge fixed in the sleeve.

2. The airbag assembly as set forth in claim 1, wherein the one-way vent is designed to allow fluid flow from the knee chamber to the upper chamber and prevent fluid flow from the upper chamber to the knee chamber.

3. The airbag assembly as set forth in claim 1, wherein the collapsible wall of the sleeve is in the upper chamber.

4. The airbag assembly as set forth in claim 1, wherein the collapsible wall is designed to be spaced from the obstruction when the pressure in the knee chamber is greater than the pressure in the upper chamber.

5. The airbag assembly as set forth in claim 1, wherein the ledge is a different type of material than the material of the sleeve.

6. The airbag assembly as set forth in claim 1, wherein the knee chamber is elongated along a cross-vehicle axis between a first end and a second end and the upper chamber extends upwardly from first end.

7. The airbag assembly as set forth in claim 1, wherein the knee chamber has a bottom end elongated along a cross-vehicle axis between a first end and a second end and the sleeve is positioned at the bottom end and the first end.

8. The airbag assembly as set forth in claim 7, wherein the upper chamber extends upwardly from first end.

9. The airbag assembly as set forth in claim 1, further comprising an inflator in the knee chamber.

10. The airbag assembly as set forth in claim 1, wherein the upper chamber is vented more than the knee chamber.

11. An instrument panel assembly comprising:

an instrument panel having a vehicle-rearward face; and an airbag inflatable to an inflated position adjacent the vehicle-rearward face, the airbag having a knee chamber and an upper chamber;

the airbag including a wall fluidly isolating the knee chamber and the upper chamber;

the airbag including a sleeve extending through the wall and fluidly communicating the knee chamber and the upper chamber; and the airbag including a one-way vent in the sleeve;

the knee chamber having a bottom end elongated along a cross-vehicle axis between a first end and a second end;

the sleeve being elongated along the cross-vehicle axis at the bottom end and elongated upwardly from the bottom end at the first end.

12. The instrument panel assembly of claim 11, further comprising a steering column, the knee chamber being below the steering column and the upper chamber extending upward from the knee chamber along the steering column in the inflated position; and a vehicle-inboard end of the upper chamber being vehicle-outboard of the steering column.

13. The airbag assembly as set forth in claim 11, wherein the one-way vent includes an obstruction in the sleeve; the obstruction includes a portion of the collapsible wall fixed in a bunched configuration.

14. The airbag assembly as set forth in claim 11, wherein the one-way vent includes an obstruction in the sleeve; the obstruction includes a ledge fixed in the sleeve.

15. The airbag assembly as set forth in claim 11, wherein the one-way vent includes a flap designed open when the pressure in the knee chamber is greater than pressure in the upper chamber and designed to close when pressure in the upper chamber is greater than pressure in the knee chamber.

16. The airbag assembly as set forth in claim 11, further comprising an inflator in the knee chamber.

* * * * *